United States Patent
Sachs et al.

(10) Patent No.: US 8,155,083 B2
(45) Date of Patent: Apr. 10, 2012

(54) TECHNIQUE FOR CONFIGURING LINK LAYER ENTITIES FOR A HANDOVER

(75) Inventors: Joachim Sachs, Aachen (DE); Reiner Ludwig, Hürtgenwald (DE); Henning Wiemann, Aachen (DE); Michael Meyer, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 895 days.

(21) Appl. No.: 12/279,895

(22) PCT Filed: Feb. 24, 2006

(86) PCT No.: PCT/EP2006/001695
§ 371 (c)(1),
(2), (4) Date: Aug. 19, 2008

(87) PCT Pub. No.: WO2007/095966
PCT Pub. Date: Aug. 30, 2007

(65) Prior Publication Data
US 2009/0052402 A1 Feb. 26, 2009

(51) Int. Cl.
*H04Q 7/00* (2006.01)
*H04W 36/00* (2009.01)
(52) U.S. Cl. ........................... 370/331; 455/436
(58) Field of Classification Search ............... None
See application file for complete search history.

(56) References Cited

U.S. PATENT DOCUMENTS

| | | | |
|---|---|---|---|
| 2003/0189909 A1* | 10/2003 | Chao et al. | 370/331 |
| 2004/0088641 A1* | 5/2004 | Torsner et al. | 714/776 |
| 2004/0146033 A1* | 7/2004 | Soderstrom et al. | 370/338 |
| 2008/0198763 A1* | 8/2008 | Fischer et al. | 370/254 |
| 2008/0268907 A1* | 10/2008 | Senarath et al. | 455/561 |
| 2009/0274098 A1* | 11/2009 | Chun et al. | 370/328 |
| 2011/0093754 A1* | 4/2011 | Chun et al. | 714/748 |

FOREIGN PATENT DOCUMENTS

EP 0 777 396 A 6/1997
EP 1 056 258 A 11/2000

* cited by examiner

*Primary Examiner* — Hassan Phillips
*Assistant Examiner* — Eunsook Choi (57) ABSTRACT

A technique of configuring link layer entities for a handover is described. In a method embodiment, the technique includes receiving from a recipient of protocol data units a supplemental status report for an existing ARQ connection in context with an imminent handover, determining service data units corresponding to buffered protocol data units taking into account information included in the supplemental report, and transferring the determined service data units to a link layer entity which is to establish a new ARQ connection to the recipient. The forced status synchronization that is based on the supplemental report prevents the transfer of service data units that have already been successfully received at the recipient.

15 Claims, 8 Drawing Sheets

TECHNIQUE FOR CONFIGURING LINK LAYER ENTITIES FOR A HANDOVER

FIELD OF THE INVENTION

The present invention generally relates to the field of handovers in mobile communication networks. In particular, the invention relates to handovers between link layer entities having control of retransmission mechanisms.

BACKGROUND OF THE INVENTION

Retransmission mechanisms, also known as automatic repeat request (ARQ) techniques, constitute an approach that addresses the loss of data on its way to the intended recipient. Such data loss can be the result of unfavourable physical conditions such as interference, noise, or multipath propagation.

ARQ techniques are based on status reports that are transmitted from a recipient of the data to indicate to the transmitter that individual data units have either been successfully received (positive acknowledgement) or lost (negative acknowledgement). Generally, the recipient generates the status reports event-based, timer-based or poll-based according to specifications of the respective ARQ protocol. Status reports may for example be scheduled after receipt of a predetermined number of data units or at predefined points in time.

The transmitter evaluates the received status reports and then decides about the retransmission of individual data units that have not or not correctly been received at the recipient. Some ARQ techniques provide for an automatic retransmission of a data unit for which no positive acknowledgement has been received within a predetermined time interval after the first transmission of the data unit.

With regard to the open systems interconnection (OSI) layer model, ARQ techniques are usually implemented on the data link layer (layer 2 or L2). The data link layer is located between the physical layer (layer 1 or L1) and the network layer (layer 3 or L3) as indicated by the protocol stack 10 shown on the left-hand side of FIG. 1.

The physical layer L1 defines the electrical and physical specifications for the network components involved in the data transfer. The data link layer L2 provides the mechanisms to transfer data between the individual network components and to detect and possibly correct errors that may occur in the physical layer L1. The network layer L3 performs network routing, flow control, segmentation/desegmentation, and error control functions. The best known example of a L3 protocol is the Internet protocol (IP).

Usually, there are one or more additional layers on top of the network layer L3. In the example shown on the left-hand side of FIG. 1, these additional layers include a transport layer L4 configured according to the transmission control protocol (TCP) and an application layer L7 configured according to the file transfer protocol (FTP). While not part of the official OSI model, additional protocols may operate between the data link layer L2 and the physical layer L1. These protocols are sometimes referred to as "layer 2.5" protocols.

Figure 1:
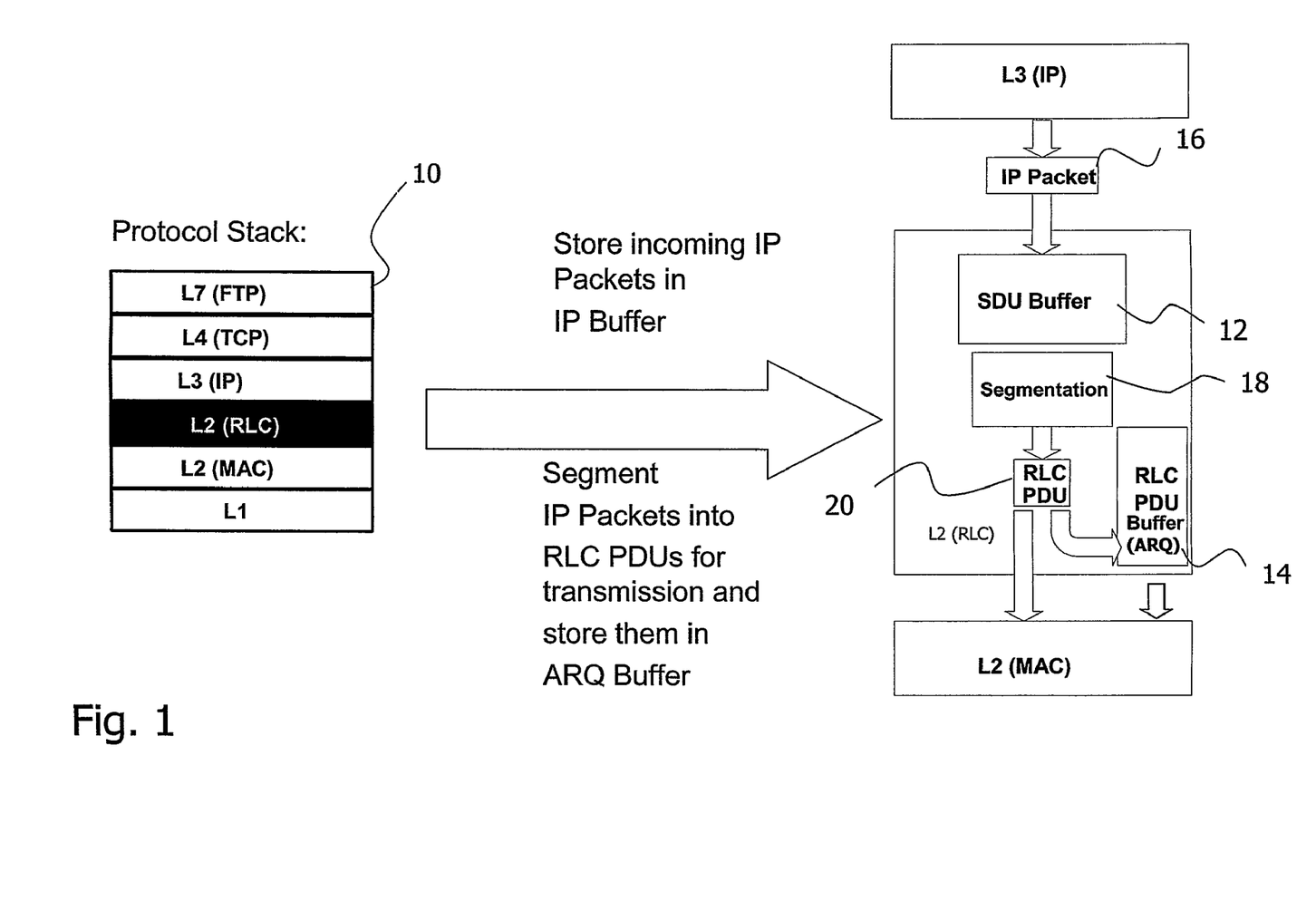
FIG. 1 is a schematic diagram illustrating on the left-hand side a protocol stack with a data link layer and on the right-hand side a various mechanisms performed in the data link layer.

In the exemplary configuration shown in FIG. 1, the data link layer L2 is divided into two sub-layers, the radio link control (RLC) layer and the medium access control (MAC) layer, respectively. The ARQ techniques are in most cases implemented within the RLC sub-layer as will now be explained in more detail with reference to the right-hand side of FIG. 1.

In the configuration shown in FIG. 1, the RLC sub-layer includes a first buffer 12 interfacing the network layer L3 and a second buffer 14 interfacing the MAC sub-layer. The first buffer 12 is provided for storing incoming service data units (SDUs) such as IP packets 16 generated within the network layer L3. The SDUs stored in the first buffer 12 are read out by a segmentation engine 18 that segments the SDUs 16 into RLC protocol data units (PDUs) 20. The PDUs 20 are on the one hand forwarded to the MAC sub-layer for transmission to the intended recipient and, on the other hand, stored in the second buffer 14 for a possible re-transmission under the regime of an ARQ protocol.

At a certain point in time, a recipient of the PDUs may require a handover from a first network component (with a link layer entity having an RLC configuration as shown in FIG. 1) to a second network component (with a similar link layer entity). In the following, some possible handover scenarios will exemplarily be described with particular reference to processes occurring on the data link layer.

Figure 2:
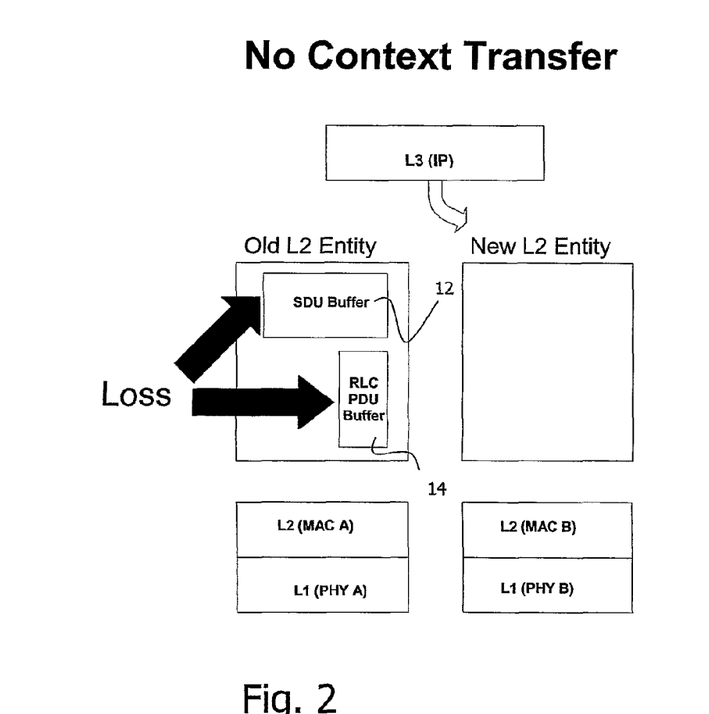
FIG. 2 is a schematic diagram illustrating a first handover procedure between two link layer entities.

In principle, the handover from a currently serving link layer entity to a new link layer entity can occur without previous buffer synchronisation as shown in FIG. 2. In this case, when the handover is to be performed between two link layer entities, the stream of SDUs is switched from the previously serving link layer entity to the new link layer entity, and the content of the buffers 12, 14 of the previously serving link layer entity is simply discarded. It is evident that the resulting loss of buffered content will slow down the operation of higher layers and can result in a temporal degradation of the service quality.

Figure 3:
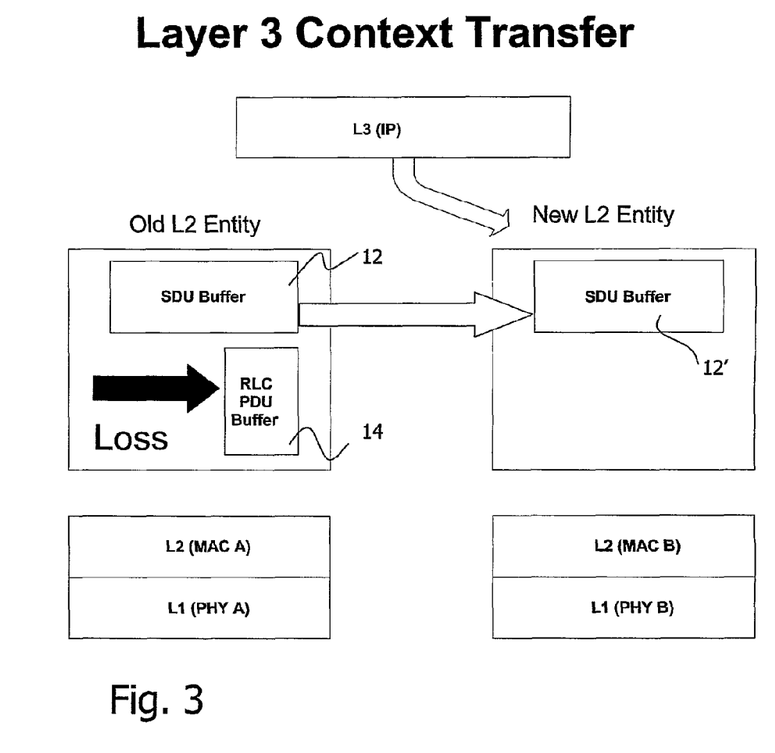
FIG. 3 is a schematic diagram illustrating a second handover procedure between two link layer entities.

According to an alternative handover scenario shown in FIG. 3, the handover can be performed such that before switching the SDU stream from the currently serving link layer entity to the new link layer entity, the content of the SDU buffer 12 of the currently serving link layer entity is transferred to the SDU buffer 12' of the new link layer entity. This process is sometimes also called L3 context transfer. In this case, only the content of the PDU buffer 14 of the previously serving link layer entity is discarded. US 2004/0146033 A1 illustrates an exemplary technique for such an L3 context transfer.

Figure 4:
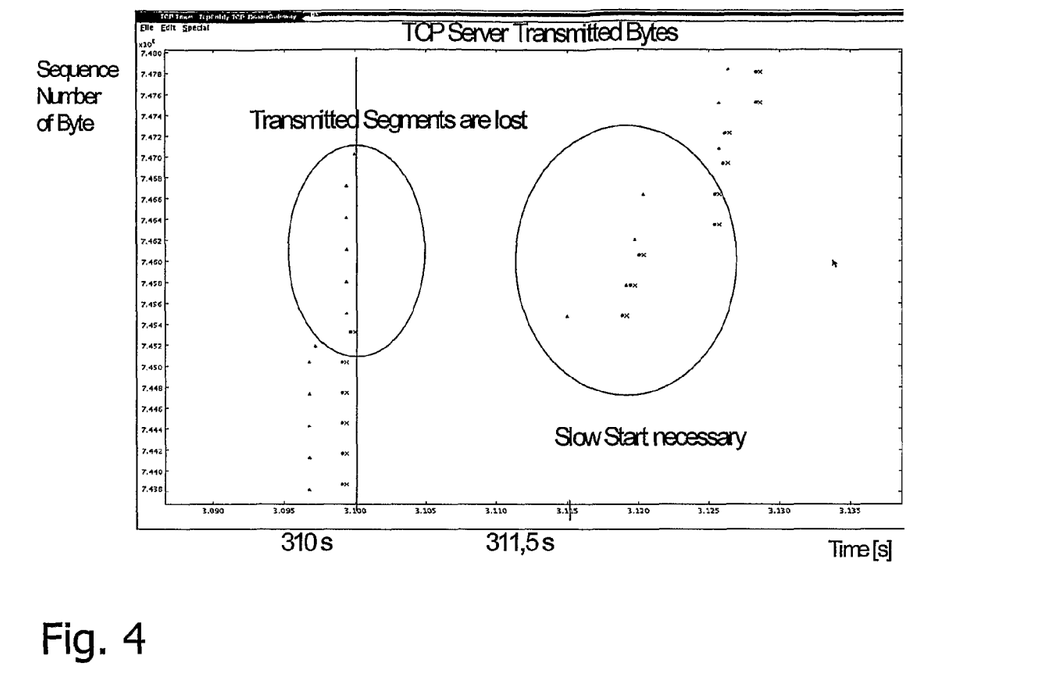
FIG. 4 shows a diagram illustrating data loss resulting from the handover procedure illustrated in FIG. 3.

One drawback of the handover approach illustrated in FIG. 3 is the fact that the data loss resulting from discarding the content of the PDU buffer 14 can still lead to a service degradation. Furthermore, the data loss may trigger higher layer protocol interactions, for example with TCP in the transport layer L4. Such higher layer protocol interactions are illustrated in FIG. 4. As can be gathered from the TCP trace shown in FIG. 4, several TCP segments are lost at the handover instant (see dark vertical line). The lost TCP segments will have to be retransmitted by TCP after the handover has occurred, which leads to a slow transmission start after the handover.

Additionally, the loss of TCP segments at the handover instant may result in a TCP timeout. Accordingly, frequent handovers may lead to the situation that a TCP sender is unable to attain a sufficiently high sending rate, thus leading to a radio link underutilization. Such a underutilization scenario is shown by the trace of the TCP congestion window CWND illustrated in FIG. 5.

Figure 5:
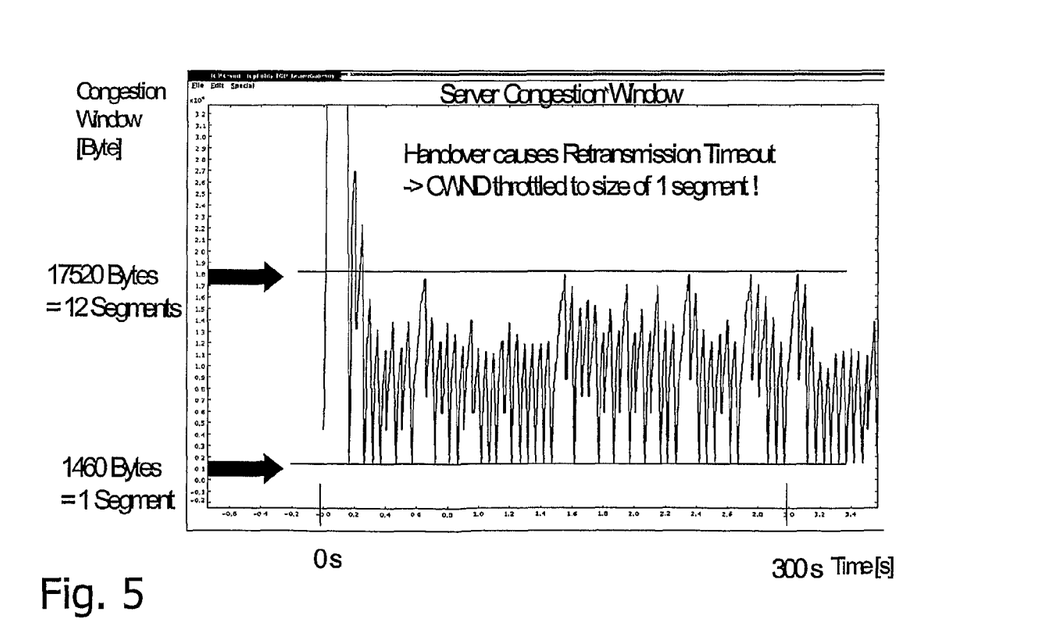
FIG. 5 is a diagram illustrating the timeout behaviour resulting from the data loss illustrated in FIG. 5.

One solution to avoid the problems illustrated in FIGS. 4 and 5 would be to make the handover actually lossless. To this end, all data currently being transmitted (and stored in the link layer PDU buffer) may be reconstructed. The SDUs reconstructed from the content of the PDU buffer may then be transferred to the new link layer entity in addition to the transfer of the SDU buffer content as shown in FIG. 3.

Figure 6:
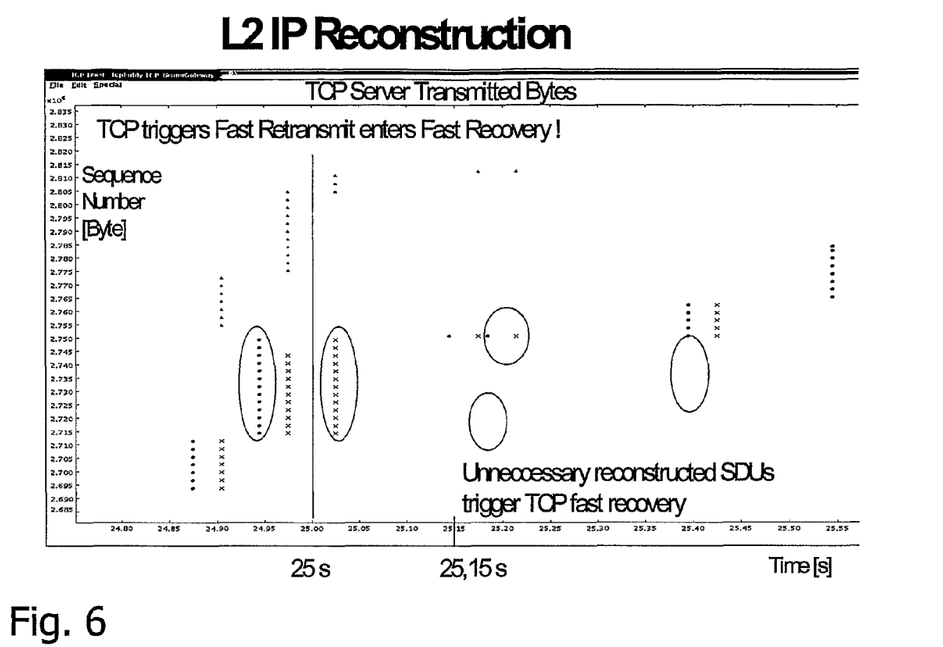
FIG. 6 is a diagram illustrating data duplication resulting from unnecessarily reconstructed SDUs.

However, it has been found that such a reconstruction approach can cause unintentional data duplication as shown in the TCP trace of FIG. 6. This data duplication is a result of the fact that some of the reconstructed SDUs have already been successfully delivered to the recipient, but the corresponding PDUs have not yet been deleted from the PDU buffer.

Figure 7:
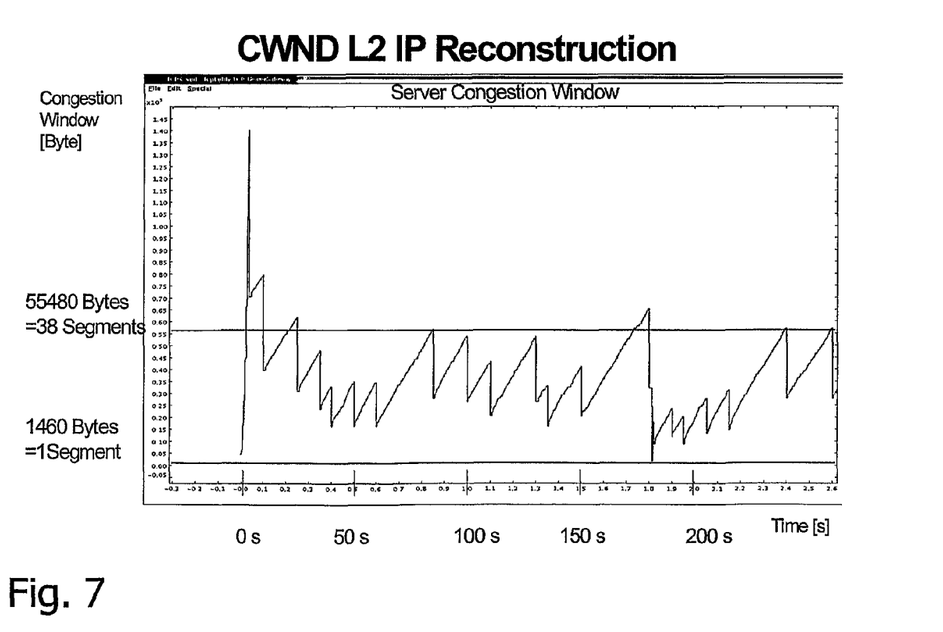
FIG. 7 is a diagram illustrating a TCP behaviour in response to duplicate acknowledgements resulting from the data duplication illustrated in FIG. 6.

The duplication shown in FIG. 6 tends to interfere with higher layer protocols such as TCP. TCP rejects two duplicate data packets with sending a TCP duplicate acknowledgement back to the TCP sender, which leads to TCP error recovery. The duplicate acknowledgement leads to a behaviour of the TCP congestion window CNWD as shown in FIG. 7. This behaviour indicates that the radio link is not fully utilized most of the time. Obviously, such an underutilization constitutes a waste of available resources.

Therefore, there is a need for an improved handover technique on a link layer level that is more compatible with ARQ protocols.

SUMMARY OF THE INVENTION

According to a first aspect, a method of configuring link layer entities for a handover is provided, with the link layer entities receiving service data units from a higher functional layer, converting the service data units into protocol data units, and buffering the protocol data units for transmission to a recipient under the regime of an ARQ protocol with status reports, wherein the status reports are indicative of receipt of one or more protocol data units at the recipient. The method comprises the steps of receiving from a recipient of protocol data units a supplemental status report for an existing ARQ connection in context with an imminent handover, determining service data units corresponding to buffered protocol data units taking into account information included in the supplemental status report, and transferring the determined service data units to a link layer entity which is to establish a new ARQ connection to the recipient.

This approach may be implemented in context with any ARQ technique, including sliding window ARQ, go-back (n) ARQ, range-based ARQ, and stop-and-wait ARQ. The supplemental status reports may be constituted by positive acknowledgements, negative acknowledgements, or any other ARQ messages including information about the current status of the recipient in relation to previously transmitted protocol data units.

The supplemental status report allows for an ARQ synchronisation between a link layer sender and a link layer recipient just before the handover is performed. In some cases, the supplemental status report may be considered as an unscheduled report because it may be generated by the recipient in addition to the status reports that are generated in a regular transmission scenario, i.e. in a transmission scenario excluding a handover procedure.

In some cases, the method may comprise the further step of the suspending transmission of service data units and/or protocol data units. This suspension preferably takes place in a close temporal relationship with receipt of the supplemental status report. According to a first option, transmission of protocol data units is suspended in response to receipt of the supplemental status report. According to another option, the transmission of protocol data units is suspended already before receipt of the supplemental status report, for example in response to receipt of a notification relating to the imminent handover.

The method may additionally comprise the step of requesting the supplemental status report from the recipient. If this requesting step is performed by the link layer entity requiring the supplemental status report, transmission of the protocol data units may be suspended in close temporal relationship (e.g. immediately before or after) the supplemental status report is requested from the recipient. In one scenario, the step of requesting the supplemental status report is initiated upon receipt of a notification relating to the imminent handover.

The supplemental status report may be requested from the recipient in various ways. The request for the supplemental status report may for example be included in a dedicated link layer message that is sent to the recipient. Additionally, or in the alternative, the supplemental status report may be requested via one or more radio resource management (RRM) messages. Alternatively, or in addition, the supplemental status report may be received via one or more RRM control messages.

According to one variation, the step of requesting the supplemental status report comprises sending a request instructing the recipient to unconditionally generate and transmit the supplemental status report. If such a request is received by the recipient, the recipient has to disregard any conditions potentially preventing or delaying the generation of a status report, such as a running status prohibit timer.

The step of determining the service data units preferably excludes such service data units that correspond to protocol data units correctly received at the recipient (as indicated in the supplemental status report). To this end, the successfully transmitted protocol data units may be deleted within the PDU buffer before initiating reconstruction. Thus, a more up-to-date reconstruction becomes possible because of the supplemental status report and the resulting enforced ARQ synchronisation immediately preceeding an imminent handover.

According to a first option, the step of determining the service data units comprises reconstructing service data units from buffered protocol data units taking into account the information included in the supplemental status report. According to another option, the step of determining the service data unit comprises selecting buffered service data units corresponding to buffered protocol data units taking into account the information included in the supplemental status report. The service data units may be selected from the conventional SDU buffer (that is filled with the service data units received from the higher functional layer, such as the SDU buffer 12 shown in FIG. 1) or from a separate SDU buffer including only such service data units that have already been or are about to be segmented into protocol data units.

As previously mentioned, the service data units received from the higher functional layer may be buffered in a link layer buffer. In such a scenario, a data context may be created from all determined service data units (e.g. those service data units that have been reconstructed from protocol data units) and, additionally, from all conventionally buffered service data units. The transferred data context will therefore also include the service data units reconstructed or otherwise determined taking into account the information included in the supplemental status report. The data context thus created may then be transferred to the link layer entity which is to establish (or has already been established) the new ARQ connection to the recipient.

The present invention may be practised in the form of a software solution, by one or more hardware components, or as a combined software/hardware approach. According to a software aspect, a computer program product is provided. The computer program product comprises program code portions for performing the process steps when the computer program product is run on one or more computing devices. The computer program product may be stored on a computer readable recording medium.

As for a hardware aspect, a device for configuring link layer entities for a handover is provided, the link layer entities receiving service data units from a higher functional layer, converting the service data units into protocol data units, and buffering the protocol data units for transmission to a recipient under the regime of an ARQ protocol with status reports, wherein the status reports are indicative of receipt of one or more protocol data units at the recipient. The device comprises a first interface adapted to receive from a recipient of protocol data units a supplemental status report for an existing ARQ connection in context with an imminent handover, a mechanism adapted to determine service data units corresponding to buffered protocol data units taking into account information included in the supplemental status report, and a second interface adapted to transfer the determined service data units to a link layer entity which is to establish a new ARQ connection to the recipient.

The device may be part of a system which additionally comprises a recipient having a reporting mechanism adapted to generate supplemental status reports for the existing ARQ connection. The device may be integrated in or otherwise communicate with one or more link layer entities. The link layer entities may in turn be incorporated in network components that can comprise one or more further functional layers.

BRIEF DESCRIPTION OF THE DRAWINGS

In the following, the invention will be described with reference to exemplary embodiments illustrated in the drawings, wherein.

DETAILED DESCRIPTION OF THE PREFERRED EMBODIMENTS

In the following description, for purposes of explanation and not limitation, specific details are set forth, such as particular sequences of process steps, individual ARQ scenarios, and specific system configurations in order to provide a thorough understanding of the present invention. It will be apparent to one skilled in the art that the present invention may be practised in other embodiments that depart from these specific details. In particular, while the embodiments will be described in a TCP/IP context, with regard to specific ARQ mechanisms, and in relation to a data link layer having a certain configuration, it is to be understood that the invention can also be implemented in context with other protocols and configurations.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

Figure 8:
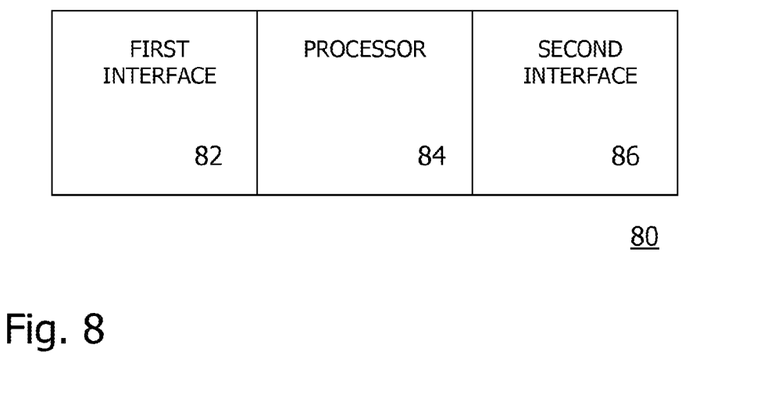
FIG. 8 is a schematic diagram illustrating an embodiment of a configuration device according to an embodiment of the present invention.

FIG. 8 shows an embodiment of a device 80 for configuring link layer entities for a handover. The device 80 includes a first interface 82 that is adapted to receive (in context with an imminent handover) a supplemental status report from a recipient of protocol data units. Thus, the supplemental status report is tied to the handover procedure. The status report pertains to an existing ARQ connection stretching between a first link layer entity and the recipient. The supplemental status report can be received via the first interface 82 in addition to regular status reports generated by the recipient in accordance with a conventional ARQ protocol.

The device 80 further comprises a mechanism 84 adapted to determine (e.g. reconstruct or select) service data units corresponding to buffered protocol data units based on information included in the supplemental status report. This information can be indicative of successful and/or failed receipt of one or more protocol data units at the recipient. The supplemental status report thus allows for a synchronization between the recipient and the first link layer entity in communication with the recipient via the existing ARQ connection. This synchronization helps to avoid the transfer of service data units that correspond to buffered protocol data units already successfully received by the recipient but not yet acknowledged by way of "regular" status reports.

Additionally, the device 80 includes a second interface 86 adapted to transfer the service data units determined by the mechanism 84 to a second link layer entity that is to establish a new ARQ connection to the recipient in context with the handover.

This handover will now be explained in more detail with reference to FIG. 9.

Figure 9:
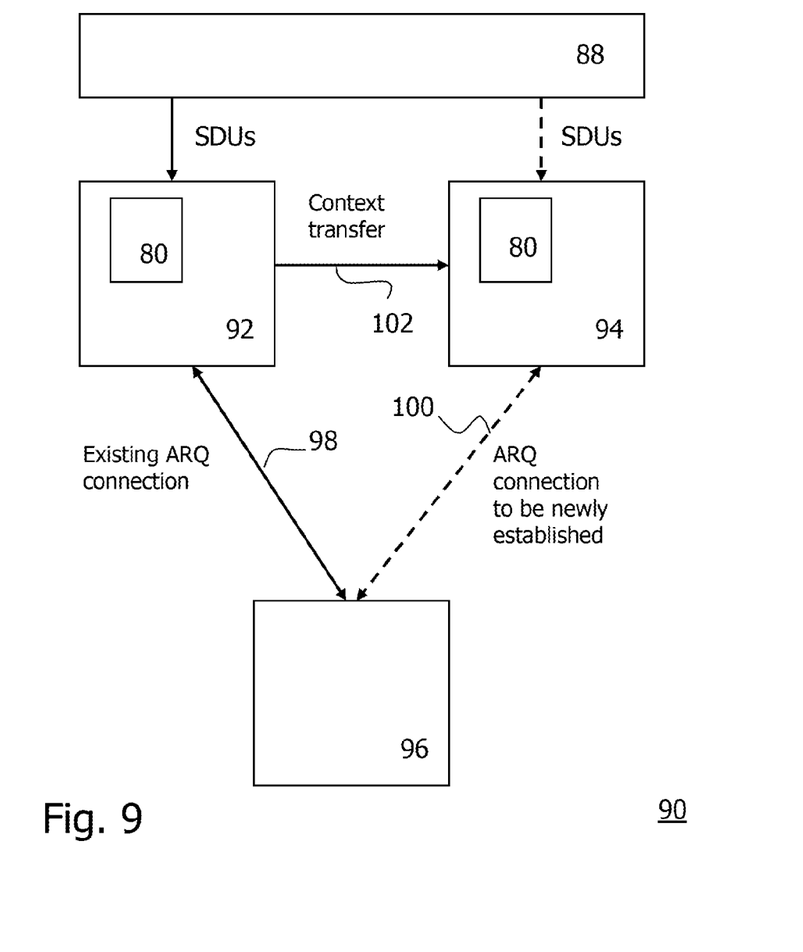
FIG. 9 is a schematic diagram illustrating a system embodiment and a handover procedure under control of the device of FIG. 8.

FIG. 9 shows a network system 90 comprising two link layer entities 92, 94, a (common) controller 88 for the link layer entities 92, 94, and a recipient 96. Each of the two link layer entities 92, 94 and the recipient 96 have a protocol stack with a data link layer that can be similar to the one shown in FIG. 1. Further, each of the link layer entities 92, 94 comprises a device 80 as shown in FIG. 8 for implementing the required handover configurations.

In one exemplary realization, the link layer entities 92, 94 are included in base stations or nodes B in accordance with the universal mobile telecommunications system (UMTS) standard. The controller 88 can be configured as a UMTS radio network controller (RNC). In the UMTS context, the recipient 96 may take the form of a user equipment (UE) such as a mobile telephone. Alternatively, the link layer entities 92, 94 may be integrated together with the controller 88 into a single RNC component.

It should be noted that the device 80 and the link layer entities 92, 94 could be implemented either on the terminal side such as within an UE (uplink) or on the network side (downlink). In a terminal scenario, the two link layer entities 92, 94 may for example constitute two different PCMCIA cards coupled to one and the same terminal such as a portable computer. Alternatively, the two link layer entities 92, 94 could be integrated in a dual mode terminal operative according to at least two wireless communication standards such as UMTS and GSM (Global System for Mobile Communications).

As can be seen from FIG. 9, there exists an ARQ connection 98 stretching between the first link layer entity 92 and the recipient 96. The ARQ connection 98 constitutes a data and/or control channel with ARQ functionalities. Due to a possible mobility of the recipient 96 or other circumstances, a handover between the first link layer entity 92 and the second link layer entity 94 may be required at a certain point in time. In the course of the handover, a new ARQ connection 100 will be established between the second link layer entity 94 and the recipient 96. After (or, in an alternative embodiment, before) the new ARQ connection 100 has been established, the existing ARQ connection 96 between the first link layer entity 92 and the recipient 96 may be terminated. In the course of the handover procedure, a data context will be transferred between the first network entity 92 and the second link layer entity 94 as indicated by the arrow 102. The data context may be transferred between the link layer entities 92, 94 directly or via the controller 88.

In the following, the communication between the four network components 88, 92, 94, 96 shown in FIG. 9 will be described with reference to the flow chart 1000 of FIG. 10, and from the perspective of the first link layer component 92.

The first link layer entity 92 constantly receives service data units from a higher functional layer, such as a network layer L3, arranged in the controller 88 or any other network component. The link layer entity 92 converts these service data units into protocol data units and buffers the protocol data units for transmission under the regime of an ARQ protocol to the recipient 96. The ARQ protocol specifies regular status reports indicative of receipt of one or more protocol data units at the recipient 96.

Figure 10:
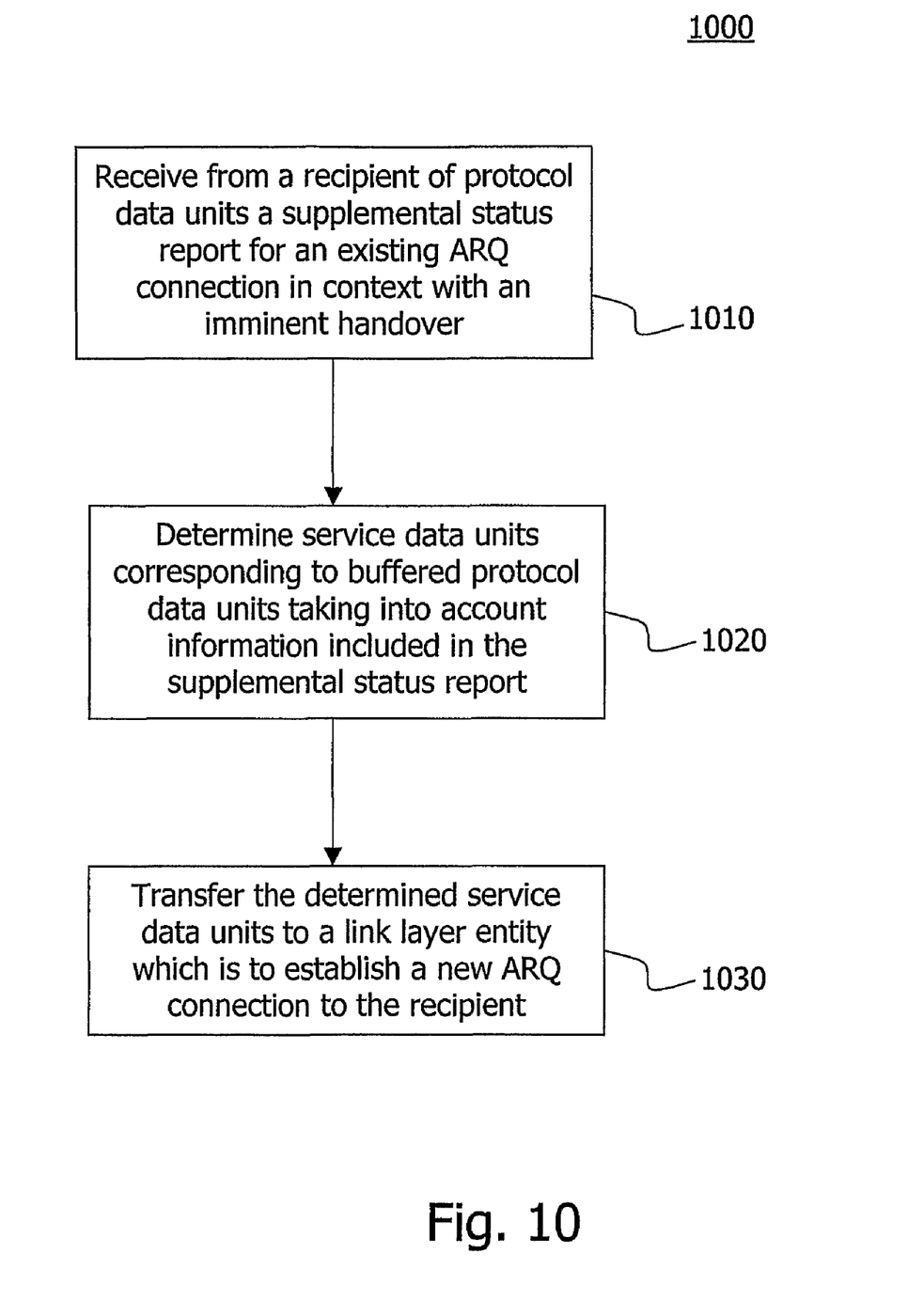
FIG. 10 is a schematic flow chart illustrating a method embodiment of the present invention.

Referring now to FIG. 10, the first link layer entity 92 receives in a first step 1010 from the recipient 96 a supplemental status report for the existing ARQ connection 98 in context with an imminent handover of the recipient 96 from the first link layer entity 92 to the second link layer entity 94.

In a second step 1020, the first link layer entity 92 determines (e.g. reconstructs or selects) service data units corresponding to buffered protocol data units taking into account status information included in the supplemental status report received from the recipient 96.

In a further step 1030, the first link layer entity transfers a data context including at least the service data units determined in step 1020 to the second link layer entity 94 as indicated by arrow 102. Additionally, the controller 88 will switch the service data unit stream from the first link layer entity 92 to the second link layer entity 94. The second link layer entity 94 will then start to transmit protocol data units via the new ARQ connection 100 to the recipient 96 taking into account the data context received from the first link layer entity 92.

In the following, a further embodiment of the invention will be described with reference to the schematic diagram shown in FIG. 11. The embodiment shown in FIG. 11 can be combined with any one of the embodiments described with reference to FIGS. 8 to 10.

Figure 11:
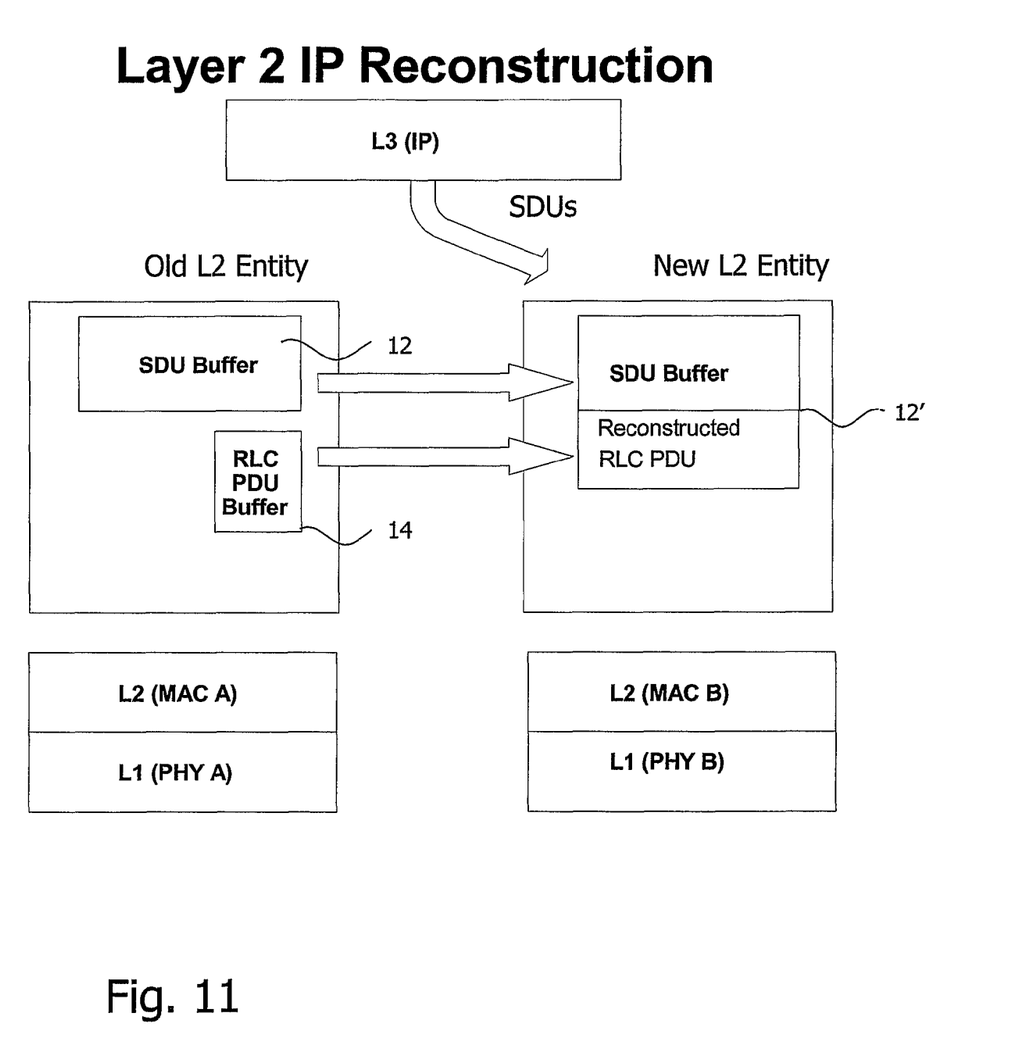
FIG. 11 is a schematic diagram illustrating a further embodiment of the present invention.

The process schematically illustrated in FIG. 11 is initiated when detecting (e.g. by the controller 88 shown in FIG. 9) that a recipient of a PDU stream requires a handover from a currently serving link layer entity (left-hand side of FIG. 11) to a new link layer entity (right-hand side of FIG. 11). In this case the currently serving link layer entity is immediately notified of the imminent handover. This notification triggers a state synchronisation between the currently serving link layer entity and the PDU recipient (not shown in FIG. 11). The state synchronisation can be performed in various ways.

In one embodiment, the currently serving link layer entity (e.g. the RLC sub-layer) sends a newly defined link layer message (in the following called Super-Poll Request) to the PDU recipient. The PDU recipient replies to the Super-Poll Request with generation of a supplemental status report and with transmission of this status report to the currently serving link layer entity. What differentiates a Super-Poll Request from a regular link layer poll is the fact that the Super-Poll Request instructs the recipient to generate and transmit the status report in any case (e.g. even if the local status prohibit timer is running).

In order to reduce the overall messaging, the handover-related Super-Poll Request may be substituted by a "default request" included as an additional setting of the handover procedure (that is typically performed via RRM messages of a radio resource control (RRC) protocol). In this case, the supplemental status report may automatically be generated and transmitted from the recipient that has been notified of the imminent handover within a dedicated or a handover-related RRM message. Accordingly, the status report for a link layer connection that is to be migrated can be included in a RRM message instead of sending it (e.g. as in the Super-Poll Request scenario discussed above) as a separate link layer message.

In context with receiving the handover notification and/or in context with generating and sending a supplemental status request, the currently serving link layer entity may optionally suspend PDU transmission to the recipient. In addition, or alternatively, the transmission of SDUs to the currently serving link layer entity may be suspended.

In response to receipt of the supplemental status report from the recipient, the currently serving link layer entity updates its transmission state. This updating step may include deleting or discarding any PDUs in the PDU buffer 14 shown in FIG. 11 that are positively acknowledged in the supplemental status report.

In a next step, the currently serving link layer entity reconstructs SDUs from the updated PDU buffer 14 for context transfer. It should be noted here that the reconstruction is only started after the content of the supplemental status report has been considered. In an alternative embodiment, the SDUs are not reconstructed from the updated PDU buffer 14, but selected from the SDU buffer 12 (in which case the SDUs read from the SDU buffer 12 for segmentation will be appropriately marked but not deleted from the SDU buffer 12), or selected from a dedicated SDU buffer (not shown) in which the SDUs which have been read out for segmentation are temporarily stored for the generation of a handover-related data context. In the selection scenario, those SDUs that are acknowledged in the supplemental status report will not be selected for data context generation.

In the reconstruction scenario, the currently serving link layer entity creates a data context from all SDUs that are stored in the SDU buffer 12 and additionally from those that have been reconstructed from the updated PDU buffer 14. The data context including the buffered and reconstructed SDUs is then forwarded to the new link layer entity as indicated by the two arrows in FIG. 11. At the new link layer entity, the SDUs included in the data context are stored in the local SDU buffer 12'. Consequently, this SDU buffer 12' will also include SDUs corresponding to PDUs reconstructed from the updated PDU 14 of the currently/previously serving link layer entity.

In a final step, the SDU stream is switched to the new link layer entity as shown in FIG. 11, and the new link layer entity starts to transmit PDUs to the original recipient via a newly established ARQ connection.

Figure 12:
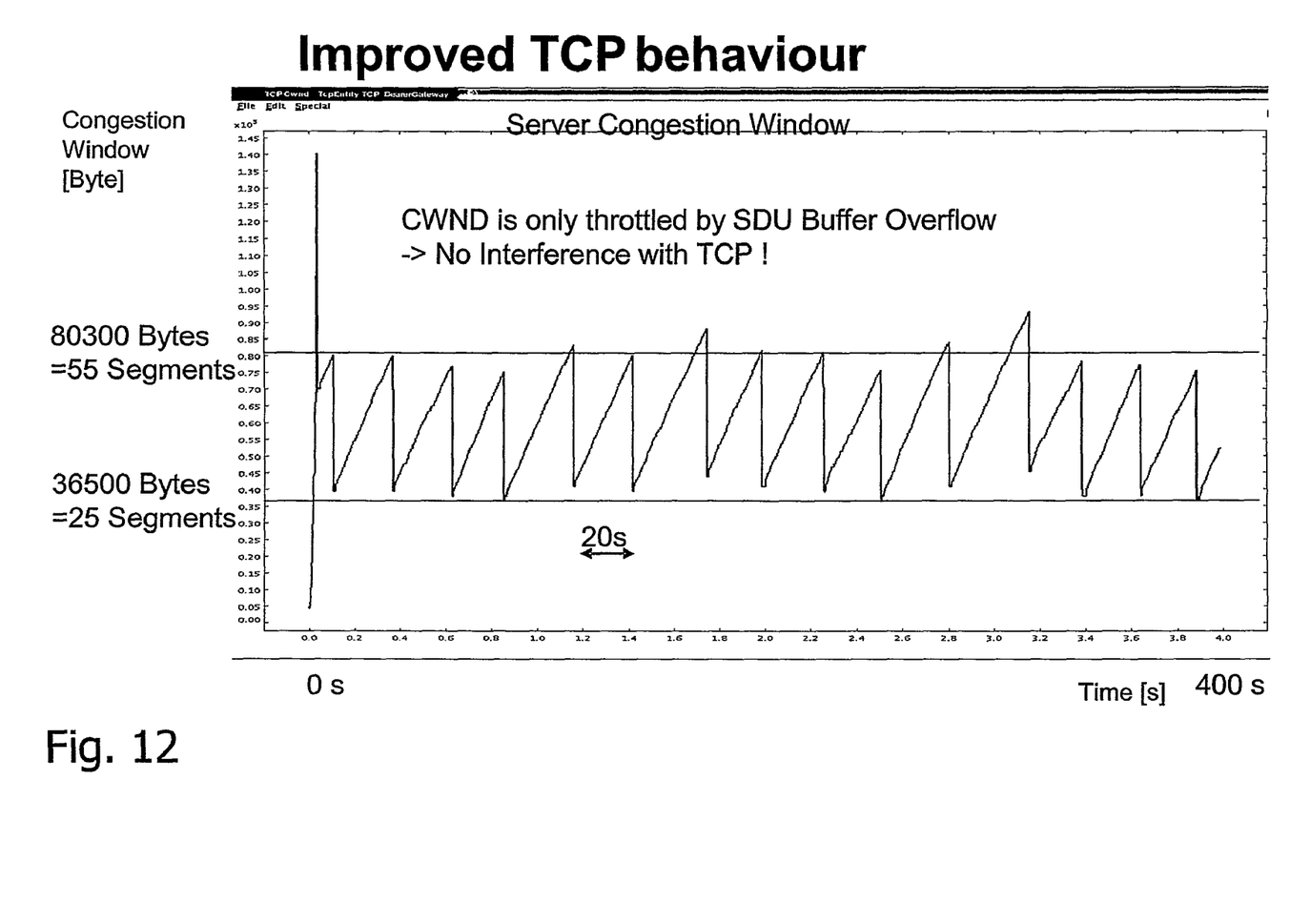
FIG. 12 is a diagram illustrating an improved TCP behaviour resulting from an implementation of the present invention.

As has become apparent from the above description, the embodiments allow for a lossless handover without duplication of SDUs that have already been successfully transmitted. As a consequence, negative interactions with higher layer protocols such as TCP can be avoided as illustrated in the diagram of FIG. 12. As can be gathered from FIG. 12, the congestion window CWND is only throttled by SDU buffer overflow, but no interference with TCP due to unintentional data duplications at handovers can be noticed.

It should be noted that the present invention is applicable to a wide variety of handover scenarios. These scenarios include intra-system handovers, inter-system handovers between different radio technologies (e.g. access switches), handovers between different access gateways in the long term evolution (LTE) project of the third generation partnership project (3GPP), and handovers between 3GPP LTE release 7 and pre-release 7 3GPP access. Additionally, the serving radio network system (SRNS) relocation mechanism within 3GPP networks can be improved for inter-RNC handovers.

It will be appreciated by those skilled in the art that the above-described embodiments may be adapted or extended in various ways. While the foregoing description thus makes reference to preferred embodiments, the scope of the invention is defined solely by the claims that follow and the elements recited therein.

The invention claimed is:

1. A method of configuring link layer entities for a handover, the link layer entities receiving service data units from a higher functional layer, converting the service data units into protocol data units and buffering the protocol data units for transmission to a recipient under the regime of an ARQ protocol having status reports, the status reports being indicative of receipt of one or more protocol data units at the recipient, the method comprising the steps of:
   receiving from a recipient of protocol data units a supplemental status report for an existing ARQ connection in context with an imminent handover;
   determining service data units corresponding to buffered protocol data units taking into account information included in the supplemental status report; and
   transferring the determined service data units to a link layer entity for establishing a new ARQ connection to the recipient.

2. The method of claim 1, further comprising the step of suspending transmission of protocol data units in a close temporal relationship with receipt of the supplemental status report.

3. The method of claim 1, further comprising the step of requesting the supplemental status report from the recipient.

4. The method of claim 3, wherein the step of requesting the supplemental status report is initiated upon receipt of a notification relating to the imminent handover.

5. The method of claim 3, wherein the step of requesting the supplemental status report includes sending a dedicated link layer request message to the recipient.

6. The method of claim 3, wherein the step of requesting the supplemental status report is implemented as a handover setting on the side of the recipient.

7. The method of claim 3, wherein at least one of the steps of requesting and receiving the supplemental status report is performed via one or more radio resource management messages.

8. The method of claim 1, wherein the step of determining service data units excludes such service data units that correspond to protocol data units correctly received at the recipient.

9. The method of claim 1, wherein the step of determining service data units corresponding to buffered protocol data units comprises reconstructing service data units from the buffered protocol data units.

10. The method of claim 1, wherein the step of determining service data units corresponding to buffered protocol data units comprises selecting service data units from a buffer.

11. The method of claim 3, wherein the step of requesting the supplemental status report comprises generating a request instructing the recipient to unconditionally generate the supplemental status report.

12. The method of claim 1, further comprising the step of buffering the service data units prior to conversion.

13. The method of claim 12, further comprising the steps of:
   creating a data context from all buffered service data units and all determined service data units; and
   transferring the data context to the link layer entity which is to establish the new ARQ connection to the recipient.

14. A device for configuring link layer entities for a handover, the link layer entities receiving service data units from a higher functional layer, converting the service data units into protocol data units, and buffering the protocol data units for transmission to a recipient under the regime of an ARQ protocol having status reports, the status reports being indicative of receipt of one or more protocol data units at the recipient, the device comprising:
   a first interface adapted to receive from a recipient of protocol data units an supplemental status report for an existing ARQ connection in context with an imminent handover;
   a processor configured to determine service data units corresponding to buffered protocol data units taking into account information included in the supplemental status report; and
   a second interface adapted to transfer the determined service data units to a link layer entity which is to establish a new ARQ connection to the recipient.

15. A system comprising:
   a device, in communication with one or more link layer entities, for configuring link layer entities for a handover, the link layer entities receiving service data units from a higher functional layer, converting the service data units into protocol data units, and buffering the protocol data units for transmission to a recipient under the regime of an ARQ protocol having status reports, the status reports being indicative of receipt of one or more protocol data units at the recipient, the device comprising:

a first interface adapted to receive from a recipient of protocol data units an supplemental status report for an existing ARQ connection in context with an imminent handover;

a processor configured to determine service data units corresponding to buffered protocol data units taking into account information included in the supplemental status report; and a second interface adapted to transfer the determined service data units to a link layer entity which is to establish a new ARQ connection to the recipient and a recipient having a reporting mechanism adapted to generate supplemental status reports.

* * * * *